Figures 1, 2:
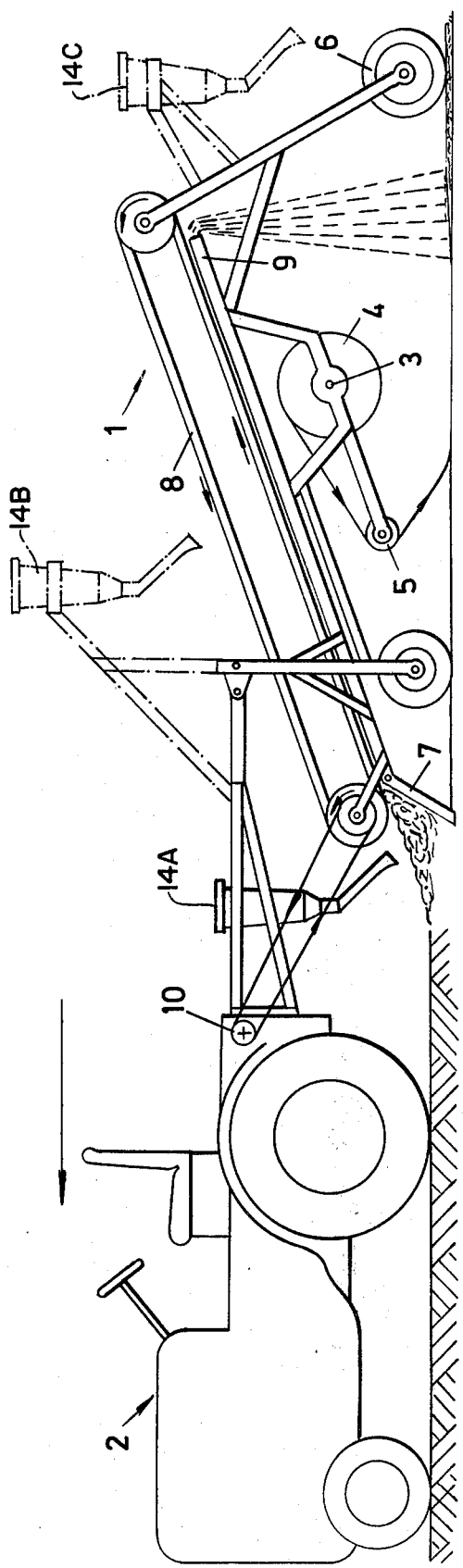

United States Patent [19]

Huggett

[11] 3,980,029

[45] Sept. 14, 1976

[54] GRASS GROWING

[75] Inventor: Wallace A. Huggett, Marlette, Mich.

[73] Assignee: F. B. Mercer, Limited, England

[22] Filed: Dec. 2, 1974

[21] Appl. No.: 528,745

[30] Foreign Application Priority Data

Dec. 4, 1973 United Kingdom............... 56148/73

[52] U.S. Cl........................................ 111/1; 47/56
[51] Int. Cl.².......................................... A01C 1/04
[58] Field of Search................... 111/1, 3; 47/56, 9; 172/33

[56] References Cited
UNITED STATES PATENTS

| | | | |
|---|---|---|---|
| 2,788,725 | 4/1957 | Wilkey et al........................ | 172/33 |
| 3,460,493 | 8/1969 | Stephenson et al.................. | 111/3 |
| 3,845,584 | 11/1974 | Mercer................................. | 47/56 |

FOREIGN PATENTS OR APPLICATIONS

| | | | |
|---|---|---|---|
| 1,126,663 | 3/1962 | Germany............................. | 47/56 |
| 1,094,681 | 12/1967 | United Kingdom................ | 172/112 |

*Primary Examiner*—Stephen C. Pellegrino
*Attorney, Agent, or Firm*—Stevens, Davis, Miller & Mosher

[57] ABSTRACT

A method for preparing a soil surface for grass growing wherein soil is continuously scraped from the surface in advance of a travelling reel carrying mesh sheet. The reel is continuously unwound during travel and the mesh sheet is laid on the scraped surface while the scraped soil is continuously conveyed to the rear of the reel and deposited on the laid mesh sheet. Apparatus for carrying out the method is also disclosed.

4 Claims, 2 Drawing Figures

U.S. Patent  Sept. 14, 1976  3,980,029

GRASS GROWING

This invention relates to the preparation of soil for growing grasses or like soil binding plants (hereinafter referred to simply as grass) particularly in the cultivation of tensilely reinforced turfs or sods.

It is known that grass seed can be sown upon a suitably prepared earth surface containing the required plant nutrients to support plant growth and given the correct conditions of light, heat and moisture to effect seed germination and subsequent plant growth, then according to the selection of the types of grass seed and the rate of sowing i.e. the number of seeds per given area, a healthy, dense and eye-appealing grass sward can be produced within thirty to seventy days. After this relatively short growing period there has usually been insufficient root entanglement, particularly laterally, to enable the turf or sod to be cut from the ground and lifted in a sufficiently coherent state to enable the turf or sod to be easily handled and transported.

In countries such as the United States of America where turf or sod is produced in commercial quantities on a very large scale, it is often preferred to use a grass seed mixture containing a high proportion of Poa Pratensis commonly known as Bluegrass. Extravaginal growth produces rhizomatous lateral shoots containing nodes and internodes, and the nodes being usually below the soil surface are themselves capable of producing roots in addition to shoots. It is mainly rhizomatous lateral shoot growth, and the growth from the nodes produced thereon, which gives the turf or sod sufficient lateral strength to enable it to be cut from the ground, lifted, handled, transported and subsequently layed upon a prepared earth surface. The downward root growth from the original seed, which after germination becomes a crown, and the downward root growth from the rhizome nodes, bind the soil in the cut and lifted turf or sod ensuring that a relatively level surface is retained on the underside of the turf or sod, i.e. away from the grass blades or shoots, which enable intimate contact to be obtained between the underside of the turf or sod and the surface of the prepared ground on which the turf or sod is layed.

Since the production of lateral shoots and root growth are required to give lateral strength in the turf or sod, a relatively slow process, it has previously been proposed to incorporate reticulate structures such as plastic mesh prior to or during the laying of the seed bed below or within the rooting compound layer in which the grass seed will ultimately grow.

In U.S. Pat. No. 2,605,589 Kuestner proposes a method whereby a layer of humus, peat moss or material containing plant food is covered by a layer of plastic mesh which is then covered by a similar but preferably thicker layer of humus. The grass seeds are then sown upon the surface of the uppermost layer of humus and covered by a thin layer of sand or vermiculite.

In pending British patent application No. 43457/70 there is proposed a method for the rapid production of turf (grass-bearing lamina) wherein a plastic mesh is placed upon a root impermeable surface which is subsequently covered by a layer of rooting compound containing grass seed.

In both of these methods and other similar proposals it is necessary to cover the plastic mesh, after it has been layed, with materials such as humus or other rooting compounds.

For large scale turf or sod production such as is carried out for example in the State of Michigan in the United States of America, it is necessary that all stages of the turf or sod production should be as mechanised as possible and that all equipment used should be power driven or tractor drawn. It is also essential to keep the number of mechanical steps comprising the process down to a minimum and as far as possible eliminate the transportation and handling of all materials other than the grass seed itself and fertilizer.

Copending U.K. patent application No. 44982/72 also discloses a method of producing tensilely reinforced turf or sod in which a dimensionally stable openwork sheet structure preferably in the form of a plastics mesh is placed on top of and in intimate contact with a previously prepared surface layer of soil before, during or after the sowing of the seed and before the seed has begun to sprout. Then, when the seeds produce roots and lateral growths, these intertwine with the mesh structure to produce a firmly bound grass structure so that a stable turf or sod can be cut from the upper soil layer a shorter time after seeding than with conventional techniques.

It is an object of the present invention to provide a novel and improved means for preparing soil for growing grass utilizing a reticulate sheet structure to bind the seed growths.

According to the invention a reticulate mesh or net sheet is continuously unwound onto a soil surface from a travelling reel whilst soil is continuously scraped from the surface in advance of the reel and conveyed to the rear of the reel where the soil is continuously deposited onto the already laid sheet.

The invention consists in a machine for preparing a soil surface for grass growing comprising a structure adapted for travel along the soil surface, mounting means on the structure for a reel of reticular mesh or net sheet whereby travel of the structure along the soil surface causes the sheet to be continuously withdrawn from the reel and laid on the surface, scraper means on the structure forwardly of the reel mounting means for continuously scraping soil from the surface in advance of the reel during travel of the structure, and conveyor means on the structure for conveying soil from the scraper rearwardly to continuously deposit said soil on the already laid sheet to the rear of the reel.

In use, grass seeds may be deposited onto the soil surface in advance of the travelling structure or may be deposited onto the conveyor means in either of which cases the seeds become mixed with the soil which is deposited onto the already laid sheet. Alternatively seeds may simply be deposited onto the soil after passage of the structure.

The invention will now be described by way of an example with reference to the accompanying drawings in which:

FIG. 1 is a side view of a vehicle for laying reticulate sheet material on a ground surface for subsequent grass growing and, FIG. 2 is a perspective scrap view showing the construction of a conveyor band used in the vehicle shown in FIG. 1.

In carrying the invention into effect according to one convenient mode by way of an example, a wheeled vehicular structure 1 is adapted to be towed or driven over a soil surface by a tractor or the like 2. Approximately centrally of its length the structure carries an axle 3 or the like for freely rotatably mounting a transverse reel of reticulate mesh or net sheet 4 (preferably dimensionally stable plastics net). The sheet from the reel 4 is wound over an idler roller 5 and hence onto the ground and under rear wheels 6 of the structure. Accordingly as the structure advances, sheet will be continuously withdrawn from the reel and laid on the soil surface to the rear of the structure. At the forward end of the structure an inclined scraper blade 7 extending the width of the reel is provided, having a rake and height adjustment to suit soil conditions so that the leading end of the blade projects slightly into the upper soil layer in advance of the structure. Thus as the structure is towed over the surface the upper soil surface is scraped away and collects on the blade.

An upwardly and rearwardly inclined endless conveyor belt 8 of substantially the same width as the scraper blade extends from the upper end of the blade over and to the rear of the reel mounting means with a fixed plate 9 being provided just below and parallel to the lower conveyor run, the plate terminating just short of the rear end of the conveyor. The conveyor is of a pocketed or cellular construction for example being made of shaped sheets 11 pivoted to rods 12 as shown in FIG. 2 so as to continuously withdraw soil from the soil build-up on the scraper blade, convey the soil along the fixed plate up and over the reel mounting means, and at the termination of the plate, allow the soil continuously to drop onto the already laid sheet at the rear of the machine. The conveyor may be driven as shown from a power outlet 10 on the tractor or the like.

As mentioned above, grass seeds may be deposited on the soil in advance or to the rear of the machine or may be deposited onto the upper run of the conveyor. When the seeds put out roots and other growths these will intertwine with the reticulate mesh structure as for example described and illustrated in U.K. patent application No. 44982/72, and if required stable turfs or sods can be cut from the upper soil layer.

If the net structure is fastened down to the ground at its end, then it will unreel itself as the machine travels over the soil and the roller or other unwinding means can be dispensed with.

The invention is illustrated in the accompanying drawings.

I claim:

1. A method of embedding a reticulate mesh or net surface within a scraped soil surface for grass growing comprising continuously unwinding a reticulate mesh or net sheet onto the scraped surface from a travelling reel while continuously scraping soil from the surface in advance of the reel, conveying said scraped soil to the rear of the reel, mixing said scraped soil with seed, holding said sheet in contact with the scraped soil surface and continuously depositing said seeded scraped soil onto the already laid sheet.

2. A method as claimed in claim 1 including depositing grass seeds onto said surface before soil is scraped therefrom whereby said seeds become mixed with the scraped soil.

3. A method as claimed in claim 1 including depositing grass seeds into the scraped soil before the scraped soil is deposited onto the already laid sheet.

4. A machine for preparing a soil surface for grass growing comprising a structure mounted on wheels for travel along the soil surface, a reel mounted on the structure of reticulate mesh or net sheet whereby travel of the structure along the soil surface causes the sheet when underneath the wheels to be continuously withdrawn from the reel and laid on the surface, scraper means on the structure forwardly of the reel mounting means for continuously scraping soil from the surface in advance of the reel during travel of the structure, conveyor means on the structure for conveying soil from the scraper rearwardly to continuously deposit said soil on the already laid sheet to the rear of the reel and seeding means mounted on said structure.

* * * * *